3,089,823
AQUEOUS VITAMIN A OIL EMULSION
Ronald F. Czarnecki, Rochester, N.Y., assignor to Eastman Kodak Company, Rochester, N.Y., a corporation of New Jersey
No Drawing. Filed Sept. 5, 1961, Ser. No. 135,755
9 Claims. (Cl. 167—81)

This invention relates to vitamins. More particularly, it relates to an aqueous emulsion of a vitamin A oil.

Many compounds having vitamin A activity are normally oils. Typical of such compounds are vitamin A alcohol (frequently referred to as just vitamin A), vitamin A aldehyde and higher fatty acid esters of vitamin A alcohol, such as vitamin A palmitate. Because of their oily nature these compounds are not soluble in water. However, with the aid of various additives, these compounds can be dispersed in water to form highly fluid, stable, emulsions of the oil-in-water type. Such emulsions are useful for adding vitamin A activity to poultry feed, to molasses for subsequent addition to animal feed, to wet dog food and to various nutritional products where a water-dispersible vitamin supplement is desired.

A common formulation for an aqueous emulsion of a vitamin A oil consists essentially of an oily vitamin A active compound, water and methyl cellulose. The methyl cellulose in such a formulation functions to maintain the oil phase of the formulation in dispersed condition once dispersion has been established, whereby the aqueous emulsion is made stable. Hence, the methyl cellulose in this formulation functions as an emulsion stabilizer.

Heretofore, such a formulation has not been entirely satisfactory for this reason. After the emulsion has been prepared and then stored in a container under normal storage conditions for several days an intense yellow colored ring develops in the upper portion of the emulsion and near the wall of the container. This color ring is objectionable. Hence, the problem heretofore has been how to suppress the development of this color ring.

An object of this invention is to solve this problem.

A specific object of this invention is to provide a stable, aqueous emulsion consisting essentially of an oily vitamin A active compound, water and methyl cellulose, which emulsion develops little or no color ring under normal storage conditions.

A particular object of this invention is to provide a stable, aqueous emulsion consisting essentially of a vitamin A oil, water, methyl cellulose and an innocuous additive which functions to suppress color ring development under normal storage conditions.

These objects and others are achieved by this invention which is based on the discovery that under normal storage conditions gelatin at a small but effective concentration checks color ring development of a highly fluid, stable, aqueous emulsion consisting essentially of a vitamin A active oil, water and methyl cellulose.

In summary, this invention comprises in general a low viscosity, stable, aqueous emulsion of the oil-in-water type, which consists essentially of an oleaginous vitamin A active compound, water, methyl cellulose and gelatin at a small but effective concentration. In certain specific embodiments of this composition additional components are also present.

The vitamin A active compound present in the general composition of this invention is under normal conditions an oil. Typical examples of such a compound have already been mentioned.

Concentration of the oleaginous vitamin A active compound in the composition in general depends upon the vitamin A activity of the compound and upon the desired vitamin A activity of the composition. Usually when a compound of high vitamin A activity is employed, such as, for example, vitamin A alcohol, vitamin A palmitate and the like, concentration of the compound is about 1–10 weight percent of the composition.

Water in the composition of this invention is the continuous phase. Concentration of the water is generally about 30–95 weight percent of the composition.

Methyl cellulose in the composition of this invention functions as an emulsion stabilizer. This compound is readily available commercially, being marketed according to degree of purity and viscosity type. In general edible methyl cellulose, preferably U.S.P. grade methyl cellulose, is employed in the composition. Any one or more of the viscosity types selected from the about 10–100 centipoise types are operable in the composition of this invention. In this regard the viscosity type refers to the absolute viscosity of a 2 weight percent aqueous solution of the particular methyl cellulose involved. A preferred viscosity type is the 15 centipoise type, that is, methyl cellulose which in 2% aqueous solution at 20° C. has an absolute viscosity of 13–18 centipoises Concentration of the methyl cellulose in the composition of this invention is selected in accordance with the total oil content of the composition and desired viscosity of the composition. In general a concentration of about 1.5–3.5 weight percent produces a stable emulsion of the oil content in water with a Brookfield viscometer viscosity of the composition at 20° C. being about 100–1000 centipoises. A preferred concentration in the case of the 15 centipoise type is about 2.5 weight percent.

Gelatin in the composition of this invention functions to suppress color ring development under normal storage conditions. Just why gelatin is effective for this purpose is not known. Any edible gelatin can be used in the composition. Bloom strength of the gelatin does not appear to be critical; gelatins having Bloom strengths ranging from 0 to 100 are satisfactory.

Concentration of the gelatin in the composition of this invention is less than that at which gelation of the continuous phase of the emulsified composition occurs. On the other hand it is sufficient to minimize color ring development. In general a concentration of about 0.25–1.5 weight percent gives the desired results. Optimum results are obtained at a preferred concentration of about 0.75–1.5 weight percent.

Other components of the composition in certain specific embodiments thereof include other fat-soluble vitamin active compounds (for example, vitamin E active compounds such as d-α-tocopheryl acetate and the like), vitamin D active compounds such as vitamin $D_2$ and the like, etc. Also included in some embodiments is an oil extender (for example, a vegetable oil such as cottonseed oil) to furnish an adequate total oil content for emulsion stability. Preferred specific embodiments of the composition preferably comprise an antioxidant component which includes one or more antioxidants for the vitamin A oil. In addition, a mold inhibiting agent, for example, sodium propionate and the like, is preferably present. For freeze-thaw stability preferred embodiments of the general composition of this invention comprise a freeze-thaw stabilizer such as propylene glycol and the like.

The composition of this invention and specific embodiments thereof are made preferably by separately preparing the aqueous phase and the oil phase and then vigorously admixing as by power homogenization the two phases at room temperature. The aqueous phase comprises water, methyl cellulose, gelatin and when called for by the formulation of a specific embodiment propylene glycol and sodium propionate. The aqueous phase is prepared by first admixing the water and methyl cellulose in accordance with the usual practice. When the methyl cellulose has gone into solution then the gelatin and other components of the aqueous phase are admixed with the water and methyl cellulose. The oil phase comprises the vitamin A active oil and such other components as other fat-soluble vitamin active compounds, oil extender, antioxidants and the like. The oil phase is prepared by merely admixing the various compounds thereof.

The composition of this invention and specific embodiments thereof are useful, for example, in poultry and livestock drink water, in the moisture phase of canned dog food and as feed additives applied as by spraying.

The invention is further illustrated by the following ing examples of various aspects thereof including specific embodiments thereof. This invention is not limited to these specific embodiments unless otherwise indicated.

*Example 1*

This example illustrates a preferred, stable, aqueous vitamin A oil emulsion of this invention.

The emulsion is formulated as follows:

| Components: | Concentration (weight percent) |
|---|---|
| All-trans vitamin A palmitate concentrate | 6.3 |
| Water | 53.1 |
| Methyl cellulose (15 cps. type) | 2.0 |
| Acid pig gelatin (Bloom strength=52) | 1.0 |
| Cottonseed Oil | 13.7 |
| Propylene glycol | 22.8 |
| Butylated hydroxyanisole | 0.25 |
| Butylated hydroxytoluene | 0.38 |
| Sodium propionate | 0.5 |

The stable emulsion of this formulation is made as follows: the aqueous phase is prepared by dissolving the methyl cellulose in the water and then admixing therewith the gelatin, propylene glycol and sodium propionate. The oil phase is prepared by admixing the all-trans vitamin A palmitate concentrate, cottonseed oil, butylated hydroxyanisole and butylated hydroxytoluene. Then the two phases are vigorously admixed at room temperature by power homogenization until a uniform dispersion of the oil phase is observed.

A stable emulsion of this formulation prepared and then stored at room temperature in a closed container for four months did not develop a color ring.

*Example 2*

This example illustrates another preferred, stable, aqueous vitamin A oil emulsion of this invention, which comprises other fat-soluble vitamin-active components.

This emulsion is formulated as follows:

| Components: | Concentration (weight percent) |
|---|---|
| All-trans vitamin A palmitate concentrate | 1.65 |
| Water | 40.8 |
| Methyl cellulose (15 cps. type) | 2.5 |
| Limed gelatin (Bloom strength=50) | 0.5 |
| d-α-Tocopheryl acetate concentrate | 35.0 |
| Vitamin $D_2$ concentrate | 0.15 |
| Propylene glycol | 17.6 |
| Butylated hydroxytoluene | 0.099 |
| Butylated hydroxyanisole | 0.066 |
| Sodium propionate | 0.5 |

The stable emulsion of this formulation is prepared preferably by the same procedure employed in Example 1.

A stable emulsion of this formulation was prepared and stored in a closed container at room temperature. After three months' storage it was observed that only a slight, yellow colored ring had formed.

*Example 3*

This example illustrates still another preferred embodiment of the composition of this invention.

The specific composition is formulated as follows:

| Component: | Composition (weight percent) |
|---|---|
| All-trans vitamin A palmitate concentrate | 1.65 |
| Water | 40.9 |
| Methyl cellulose (15 cps. type) | 2.5 |
| Acid pig gelatin (Bloom strength=52) | 0.25 |
| d-α-Tocopheryl acetate concentrate | 35.0 |
| Vitamin $D_2$ concentrate | 0.15 |
| Propylene glycol | 17.6 |
| Butylated hydroxyanisole | 0.066 |
| Butylated hydroxytoluene | 0.099 |
| Sodium propionate | 0.5 |

A stable emulsion of this formulation is prepared as in the preceding examples.

A stable emulsion of this formulation was prepared and stored in a closed container at room temperature for two months. Only a slight color ring was observed to have developed during this time.

*Example 4*

This example is still another illustration of a stable emulsion according to this invention.

The vitamin A emulsion of this example is formulated as follows:

| Component: | Concentration (weight percent) |
|---|---|
| All-trans vitamin A palmitate concentrate | 1.73 |
| Water | 40.9 |
| Methyl cellulose (15 cps. type) | 2.5 |
| Gelatin (Bloom strength=0) | 1.0 |
| d-α-Tocopheryl acetate concentrate | 35.0 |
| Vitamin $D_2$ concentrate | 0.15 |
| Propylene glycol | 17.7 |
| Butylated hydroxyanisole | 0.069 |
| Butylated hydroxytoluene | 0.104 |
| Sodium propionate | 0.5 |

A stable emulsion of this composition is prepared in the same way as in the preceding examples.

A stable emulsion of this formulation was prepared and stored in a closed container at room temperature. After 4 months' storage no color ring had developed.

*Example 5*

This example illustrates yet another specific composition of this invention.

This specific composition is formulated as follows:

| Component: | Concentration (weight percent) |
|---|---|
| All-trans vitamin A palmitate concentrate | 2.64 |
| Water | 40.9 |
| Methyl cellulose (15 cps. type) | 2.5 |
| Gelatin (Bloom strength=100) | 1.0 |
| d-α-Tocopheryl acetate concentrate | 35.0 |
| Vitamin $D_2$ concentrate | 0.15 |
| Propylene glycol | 17.6 |
| Butylated hydroxyanisole | 0.106 |
| Butylated hydroxytoluene | 0.158 |

A stable emulsion of this formulation was prepared and stored in a closed container at room temperature. In two months time no color ring had developed.

*Example 6*

This example illustrates a stable emulsion of the oil-in-water type, comprising a vitamin A oil, water and methyl cellulose but containing no gelatin.

The emulsion is formulated as follows:

| Component: | Concentration (weight percent) |
|---|---|
| All-trans vitamin A palmitate | 2.64 |
| Water | 41.3 |
| Methyl cellulose (15 cps. type) | 2.5 |
| d-α-Tocopheryl acetate concentrate | 35.0 |
| Vitamin $D_2$ concentrate | 0.15 |
| Propylene glycol | 17.7 |
| Butylated hydroxyanisole | 0.106 |
| Butylated hydroxytoluene | 0.158 |
| Sodium propionate | 0.5 |

A stable emulsion of this formulation was prepared and stored in a closed container at room temperature. After just three days a severe color ring had developed.

Hence, gelatin is effective under normal storage conditions in suppressing color ring development in stable, aqueous vitamin A oil emulsions containing methyl cellulose as an emulsion stabilizer.

Other features, advantages and embodiments of this invention will be apparent to those in the exercise of ordinary skill in the art upon reading the foregoing disclosure. All embodiments of this invention including modifications and variations thereof embracing the spirit and essential characteristics of this invention are within the scope of the claimed subject matter unless expressly excluded by claim language.

I claim:
1. A stable, aqueous vitamin A oil emulsion which consists essentially of an oily vitamin A-active concentrate at a concentration of about 1–10 weight percent; water at a concentration of about 30–95 weight percent; methyl cellulose at a concentration of about 1.5–3.5 weight percent; and gelatin at a concentration effective to substantially suppress development of coloring under normal storage conditions but ineffective to cause gelation of the water phase of said emulsion.

2. A stable, aqueous vitamin A oil emulsion characterized by the fact color ring development under normal storage conditions is suppressed, which consists essentially of a vitamin A palmitate concentrate at a concentration of about 1–10 weight percent; water at a concentration of about 30–95 weight percent; edible methyl cellulose of viscosity type selected from the about 10–100 centipoise types and at a concentration of about 1.5–3.5 weight percent; and edible gelatin at a concentration of about 0.25–1.5 weight percent.

3. A stable, aqueous vitamin A oil emulsion characterized by the fact color ring development under normal storage conditions is suppressed, which consists essentially of a vitamin A palmitate concentrate at a concentration of about 1–10 weight percent; water at a concentration of about 30–95 weight percent; edible methyl cellulose of viscosity type selected from the about 10–100 centipoise types and at a concentration of about 1.5–3.5 weight percent; and edible gelatin at a concentration of about 0.75–1.5 weight percent.

4. A stable, aqueous vitamin A oil emulsion characterized by the fact color ring development under normal storage conditions is suppressed, which consists essentially of a vitamin A palmitate concentrate at a concentration of about 1–10 weight percent; water at a concentration of about 30–95 weight percent; edible methyl cellulose of the 15 centipoise type at a concentration of about 2.5 weight percent; and edible gelation at a concentration of about 0.75–1.5 weight percent.

5. A stable, aqueous, vitamin A oil emulsion characterized by the fact color ring development under normal storage conditions is suppressed, said emulsion being formulated as follows:

| Components: | Concentration (weight percent) |
|---|---|
| All-trans vitamin A palmitate concentrate | 6.3 |
| Water | 53.1 |
| Methyl cellulose (15 cps. type) | 2.0 |
| Acid pig gelatin (Bloom strength=52) | 1.0 |
| Cottonseed oil | 13.7 |
| Propylene glycol | 22.8 |
| Butylated hydroxyanisole | 0.25 |
| Butylated hydroxytoluene | 0.38 |
| Sodium propionate | 0.5 |

6. A stable, aqueous vitamin A oil emulsion characterized by the fact color ring development under normal storage conditions is suppressed, said emulsion being formulated as follows:

| Components: | Concentration (weight percent) |
|---|---|
| All-trans vitamin A palmitate concentrate | 1.65 |
| Water | 40.8 |
| Methyl cellulose (15 cps. type) | 2.5 |
| Limed gelatin (Bloom strength=50) | 0.5 |
| d-α-Tocopheryl acetate concentrate | 35.0 |
| Vitamin $D_2$ concentrate | 0.15 |
| Propylene glycol | 17.6 |
| Butylated hydroxytoluene | 0.099 |
| Butylated hydroxyanisole | 0.066 |
| Sodium propionate | 0.5 |

7. A stable, aqueous vitamin A oil emulsion characterized by the fact color ring development under normal storage conditions is suppressed, said emulsion being formulated as follows:

| Components: | Concentration (weight percent) |
|---|---|
| All-trans vitamin A palmitate concentrate | 1.65 |
| Water | 40.9 |
| Methyl cellulose (15 cps. type) | 2.5 |
| Acid pig gelatin (Bloom strength=52) | 0.25 |
| d-α-Tocopheryl acetate concentrate | 35.0 |
| Vitamin $D_2$ concentrate | 0.15 |
| Propylene glycol | 17.6 |
| Butylated hydroxyanisole | 0.066 |
| Butylated hydroxytoluene | 0.099 |
| Sodium propionate | 0.5 |

8. A stable, aqueous vitamin A oil emulsion characterized by the fact color ring development under normal storage conditions is suppressed, said emulsion being formulated as follows:

| Component: | Concentration (weight percent) |
|---|---|
| All-trans vitamin A palmitate concentrate | 1.73 |
| Water | 40.9 |
| Methyl cellulose (15 cps. type) | 2.5 |
| Gelatin (bloom strength=0) | 1.0 |
| d-α-Tocopheryl acetate concentrate | 35.0 |
| Vitamin $D_2$ concentrate | 0.15 |
| Propylene glycol | 17.7 |
| Butylated hydroxyanisole | 0.069 |
| Butylated hydroxytoluene | 0.104 |
| Sodium propionate | 0.5 |

9. A stable, aqueous vitamin A oil emulsion characterized by the fact color ring development under normal storage conditions is suppressed, said emulsion being formulated as follows:

| Component: | Concentration (weight percent) |
|---|---|
| All-trans vitamin A palmitate concentrate | 2.64 |
| Water | 40.9 |
| Methyl cellulose (15 cps. type) | 2.5 |
| Gelatin (bloom strength=100) | 1.0 |
| d-α-Tocopheryl acetate concentrate | 35.0 |
| Vitamin $D_2$ concentrate | 0.15 |
| Propylene glycol | 17.6 |
| Butylated hydroxyanisole | 0.106 |
| Butylated hydroxytoluene | 0.158 |

No references cited.

UNITED STATES PATENT OFFICE

CERTIFICATE OF CORRECTION

Patent No. 3,089,823                                  May 14, 1963

Ronald F. Czarnecki

It is hereby certified that error appears in the above numbered patent requiring correction and that the said Letters Patent should read as corrected below.

Column 5, line 38, for "coloring" read -- color ring --.

Signed and sealed this 31st day of December 1963.

(SEAL)
Attest:
ERNEST W. SWIDER                              EDWIN L. REYNOLDS

Attesting Officer                              Acting Commissioner of Patents